(12) United States Patent
Nicholas et al.

(10) Patent No.: US 9,618,830 B1
(45) Date of Patent: Apr. 11, 2017

(54) PHOTOGRAPHY WORKSTATION

(71) Applicants: Mark Nicholas, Redondo Beach, CA (US); Jose Pinela, Gardena, CA (US)

(72) Inventors: Mark Nicholas, Redondo Beach, CA (US); Jose Pinela, Gardena, CA (US)

(*) Notice: Subject to any disclaimer, the term of this patent is extended or adjusted under 35 U.S.C. 154(b) by 0 days.

(21) Appl. No.: 14/812,124

(22) Filed: Jul. 29, 2015

(51) Int. Cl.
*G03B 17/56* (2006.01)

(52) U.S. Cl.
CPC .................................. *G03B 17/561* (2013.01)

(58) Field of Classification Search
CPC ....................................................... G03B 17/561
USPC ................................................................ 396/5
See application file for complete search history.

(56) References Cited

U.S. PATENT DOCUMENTS

| | | | |
|---|---|---|---|
| 4,729,536 A | 3/1988 | Scala | |
| 5,778,258 A | 7/1998 | Zamoyski | |
| 5,915,132 A | 6/1999 | Counts, Jr. | |
| 7,440,685 B2 | 10/2008 | Weng | |
| 7,616,886 B2* | 11/2009 | Matsumura | G03B 15/06 348/142 |
| 7,855,732 B2* | 12/2010 | Williams | G06F 3/04812 348/211.7 |
| 7,931,380 B2 | 4/2011 | Williams et al. | |
| 8,244,117 B2 | 8/2012 | Neith | |
| 8,587,778 B2 | 11/2013 | Koshimura et al. | |
| 8,909,035 B2* | 12/2014 | Jancourtz | G03B 15/00 248/123.2 |
| 2003/0128975 A1 | 7/2003 | Shevick | |
| 2006/0147188 A1* | 7/2006 | Weng | F16M 11/046 396/5 |
| 2007/0172216 A1* | 7/2007 | Lai | G03B 35/02 396/5 |
| 2016/0065798 A1* | 3/2016 | Evans | G03B 17/561 348/50 |

* cited by examiner

*Primary Examiner* — Clayton E Laballe
*Assistant Examiner* — Dennis Hancock
(74) *Attorney, Agent, or Firm* — Advantage IP Law Firm

(57) ABSTRACT

A photography workstation comprises a base and a working platform defining an inner region and an outer region having a plurality of accessory mounting stations constructed to removably secure a variety of image capturing accessories, the workstation further including an object positioner to removably secure an object to be photographically captured wherein at least one image capturing accessory may be removably secured to a mounting station and used to cooperate with an image capturing device to capture one or more images or videos of the object when the object is removably secured to the object positioner.

20 Claims, 6 Drawing Sheets

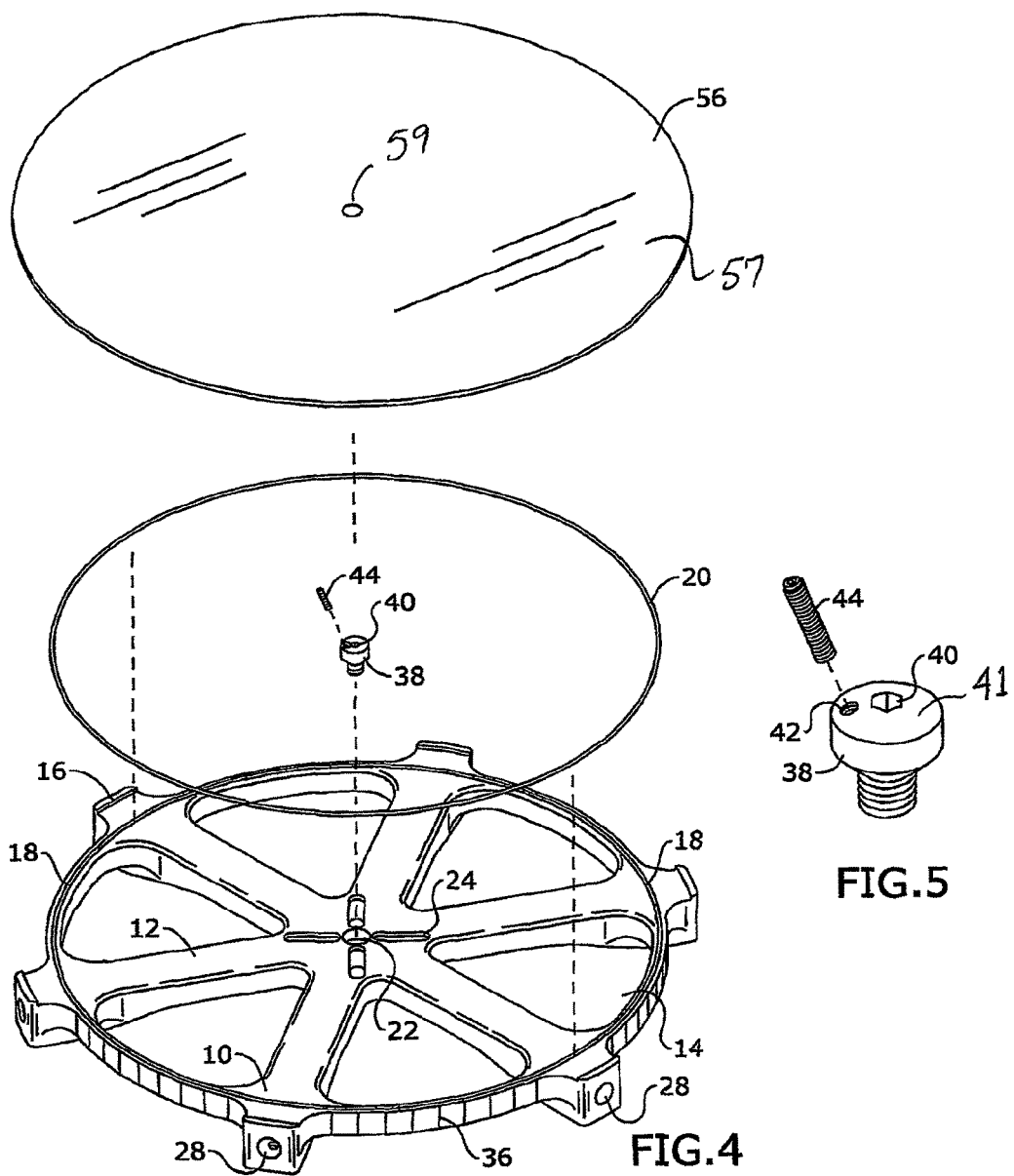

PHOTOGRAPHY WORKSTATION

BACKGROUND OF THE INVENTION

1. Field of the Invention

The present invention relates to image capturing platforms, and more specifically, to image capturing workstations for supporting image capturing devices and the objects to be captured.

2. Background Art

Photography may be art-based, business-based, or hobby-based and is carried out by professionals and amateurs alike to varying degrees. Photographing an object from a variety of angles in a variety of settings often requires positioning an object as well as setting up a number of accessories including a camera or image capture device, lighting elements, and one or more background element, among others. An object to be captured is positioned and the image capture accessories oriented or automated relative to the object and then used to produce the desired single image, series of images, or videos. Since lighting, angles, and backgrounds all cooperate to produce unique images, the capability to adjust and exchange such devices is extremely useful. Some exemplary systems may be found in U.S. Pat. No. 5,778,258 to Zamoyski and U.S. Pat. No. 5,915,132 to Counts, Jr. However, such studio-sized systems are large, complicated to assemble, breakdown, and move, are not portable as a unit, and do not facilitate close up or small scale photography.

For objects on a smaller scale and for close up photography, several turntable systems have been developed. One such example may be found in U.S. Pat. No. 7,440,685 to Weng. However, the Weng photo shelf requires a complicated support system with a number of girders providing an adjustable mounting system for a camera to move through a variety of axes and photograph an object placed on a turntable. However, there is no system for securing the object to the turntable such that the Weng photo shelf is not invertible in use, and the additional support structure adds unnecessary complexity and expense to the system. This issue is exacerbated in U.S. Pat. No. 8,244,117 to Neith, which discloses an even bulkier and complex support structure.

On a smaller scale, another turntable style system may be found in U.S. Patent Application No. 2003/0128975 to Shevick. However, the Shevick discloses a dual mode device with a first mode of attaching a camera for panoramic photography constructed to the exclusion of a second mode wherein a platter is mounted on the base to display an object for 3D photography without securing the object to the platter. Likewise, the anagraphic stand in U.S. Pat. No. 4,729,536 to Scala fails to provide the ability to secure the object to the turntable and provide an invertible system.

Given the drawbacks of the current technology, there exists a need for a photography workstation with a more compact support structure that supports the quick orientation and exchange of a plurality of image capturing accessories along with the ability to dispose and secure the object to be captured in a variety of orientations, including an inverted orientation.

SUMMARY OF THE INVENTION

In accordance with the principles of the present invention, a photography workstation is provided for capturing images or videos of an object with the workstation comprising a base and a working platform that may be fixed to a stable mount, inverted, or rotatably coupled together to define a turntable assembly with the working platform defining an interior region and a peripheral region with a plurality of accessory mounting stations with at least one mounting station constructed to removably secure at least one image capturing accessory. The workstation further includes an object positioner with a holding element constructed to removably secure an object to be image or video captured wherein at least one image capturing accessory may be removably secured to a mounting station and used to capture one or more images or videos of the object when the object is removably secured to the anchoring element by the holder.

In one aspect of the present invention, a removable tray overlying at least a portion of the interior region of the working platform is provided with the tray including an aperture providing the holder access to the anchoring element. The tray may be interchangeable with other trays offering different upper and/or lower surface characteristics to cooperate with the image capture accessories in the image or video capturing process.

In yet another aspect of the present invention, the object positioner includes an anchoring element with an elongated body having a first bore projecting at least partially therethrough and constructed to removably receive at least a portion of the holder, the elongated body further including a second bore projecting at an angle to the first bore and intersecting the first bore and a set screw that may be threadably inserted into the second bore to inhibit the holder from being removed from the elongated body.

In accordance with yet another feature of the present invention, the working platform includes a central hub within the interior region and a plurality of radially projecting spokes with at least one spoke including a radially projecting mounting station including a tubular receptacle for receiving a complementary insert of an accessory and a set screw insertable into the receptacle to abut the complementary insert and releasably secure the accessory to the mounting station.

Another aspect of the invention may be found in the addition of a motorized rotation element coupling the base to the working platform and a processing device or remote control unit in communication with the motorized rotation element and operable to command a rotation of the working platform relative to the base.

Methods of using a photography workstation to capture one or more images or videos of an object are also disclosed herein.

All of the embodiments summarized above are intended to be within the scope of the invention herein disclosed. However, despite the discussion of certain embodiments herein, only the appended claims (and not the present summary) are intended to define the invention. The summarized embodiments, and other embodiments and aspects of the present invention, will become readily apparent to those skilled in the art from the following detailed description of the preferred embodiments having reference to the attached figures, the invention not being limited to any particular embodiment(s) disclosed.

BRIEF DESCRIPTION OF THE DRAWINGS

FIG. 4 is an exploded top perspective view of the photography workstation of FIG. 2, in reduced scale;

FIG. 5 is an close up exploded view of an exemplary retaining screw for use with the photography workstation described herein;

DETAILED DESCRIPTION OF THE PREFERRED EMBODIMENTS

Figure 1:
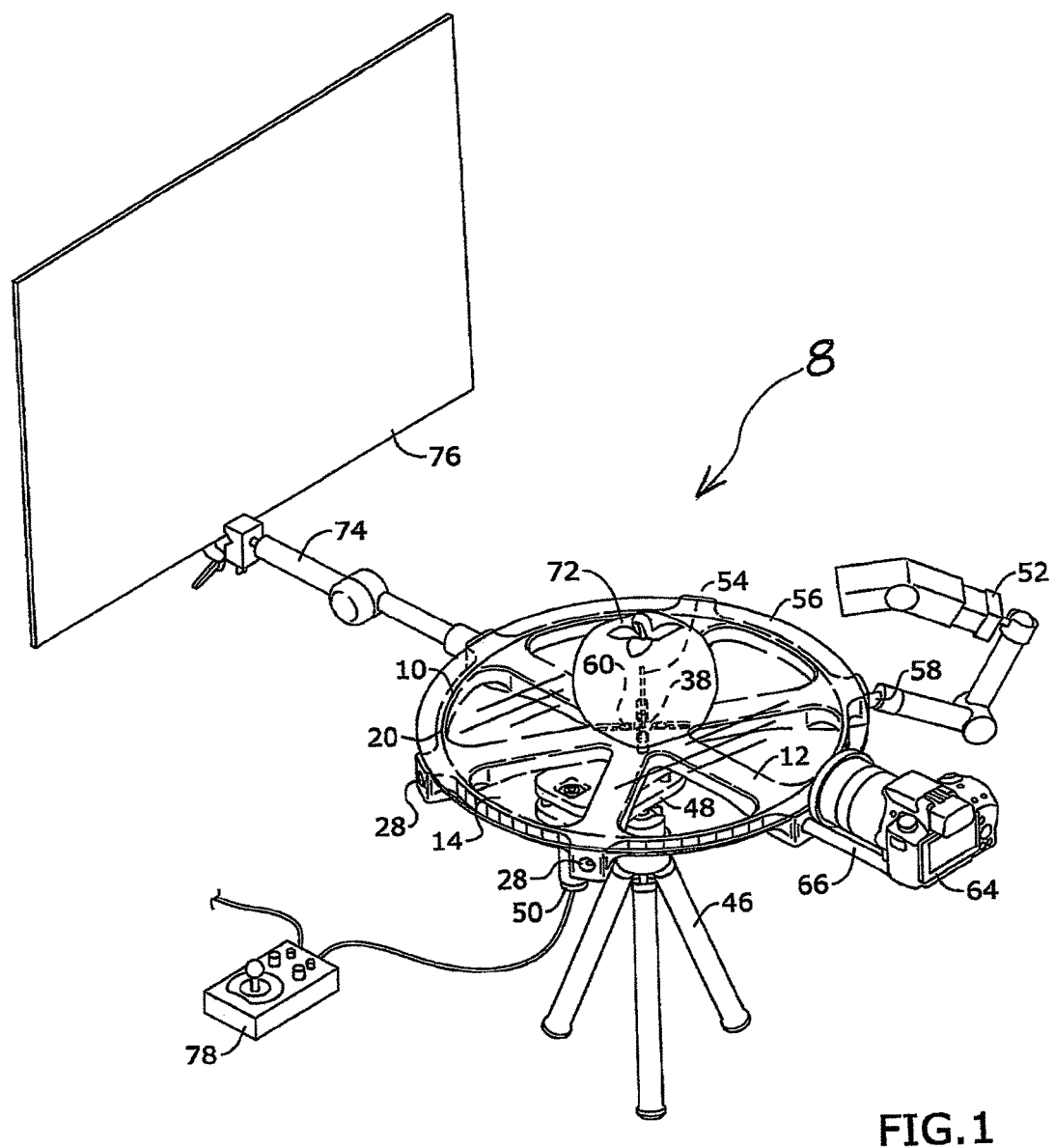
FIG. 1 is a perspective view of an exemplary first embodiment of a photography workstation, shown with a set exemplary accessories and remote control unit, in accordance with the principles of the present invention.
Figure 2:
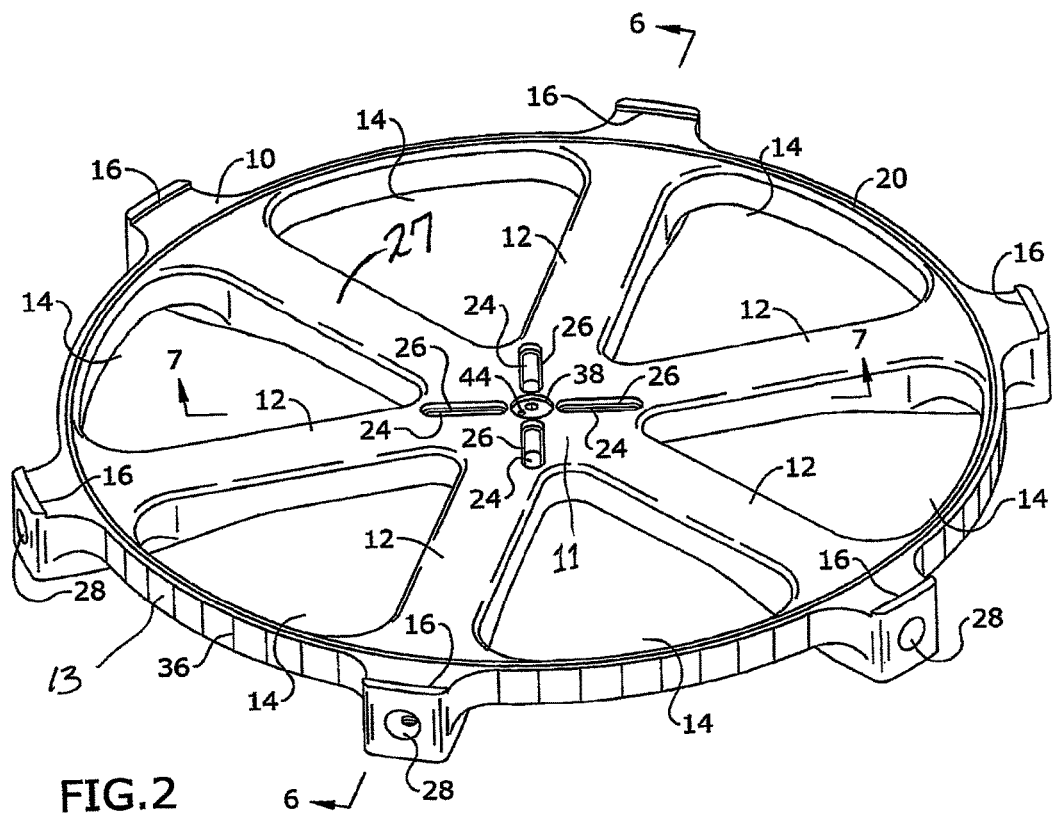
FIG. 2 is a top perspective view of the photography workstation of FIG. 1, in enlarged scale, without the accessories.

Referring now to FIGS. 1-5, in general terms, an exemplary embodiment of a photography workstation, generally designated 8, incorporates a working platform 10 that may be fixed or rotatably coupled to a support base 48 to form a workstation assembly defining a boundary. The workstation may be a single integrated unit with a base and working platform as well. In the case of a rotatable coupling, the working platform and base form a turntable assembly defining a boundary. The working platform defines a central or inner region 11 (FIG. 2) and a peripheral region 16 having a plurality of accessory mounting stations 28 with at least one mounting station 28 for removably securing one or more image capturing accessories such as a camera 52, a lighting element 64, and a background 76 to the turntable assembly. There is also an object positioner 38 to be used for removably securing an object 72 to be image or video captured on or about the workstation or turntable assembly with the accessories being positioned to cooperate and capture one or more images or videos of the object.

With continued reference to FIGS. 1-5, the working platform 10 of this exemplary photography workstation 8 includes a central region 11 (FIG. 2) or hub from which a set of support arms 12 or spokes project radially in an outward direction to intersect a peripheral band or rim 13 (FIG. 2) with a set of degree markers 36 depicted on the outer facing surface of the band. The degree markers facilitate orientation of the working platform relative to the base or mark increments for platform rotation. The arms are spaced apart by a series of roughly pie-shaped cutouts 14 and terminate in the mounting stations 28. The outermost end of the upper surface of each arm includes an upwardly projecting ridge 16. In this exemplary embodiment, the band 13 or the collective ridges provides the peripheral region 16. Spaced below the outer ridge 16 of each arm 12 is the mounting station 28 for that arm. In this exemplary embodiment, the mounting station is in the form of a tubular recess that extends partially into the arm in a radial direction and constructed to connect with standard connectors such as ⅝" C mounts and ¼"/20 threads. A fastener bore 30 or accessory screw hole (FIG. 3) projects from the bottom surface of the arm 12 to intersect the tubular recess 28. In this exemplary embodiment, the fastener bore 31 is threaded to receive a fastener 62 such as a post screw with a complementary threaded section 32 to engage the fastener bore, illustrated as a right angle bore in FIGS. 3 and. 10. The interior flat end 33 of the post screw may engage an accessory mounting post 58 (FIG. 10) that is telescopically fit into the tubular mounting station 28 to removably secure an image or video capturing accessory 52, 64, 76 attached to such a mounting post 58, 66, and 74, respectively (FIG. 1).

Figure 3:
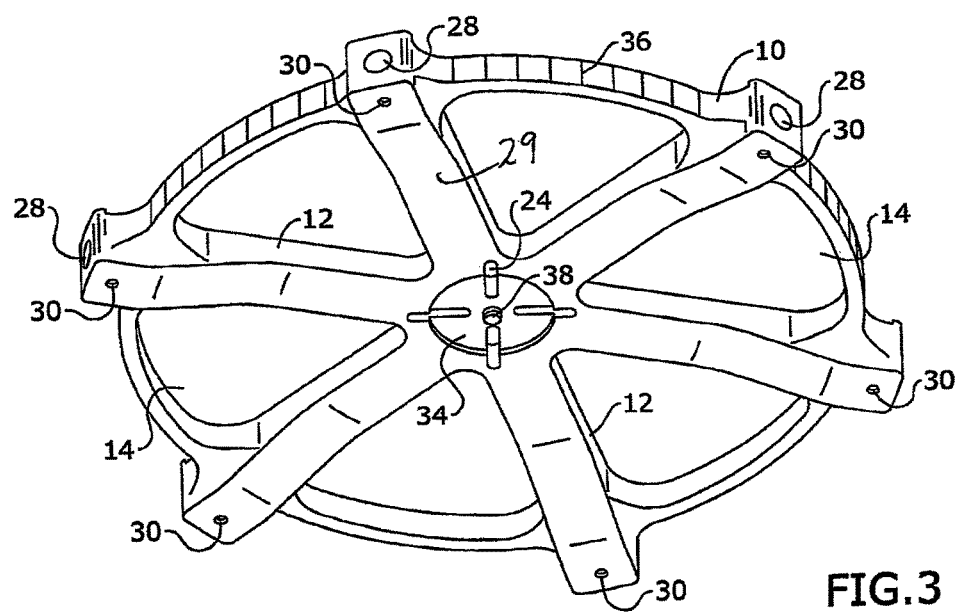
FIG. 3 is a bottom perspective view of the photography workstation of FIG. 1, in enlarged scale, without the accessories.
Figure 6:
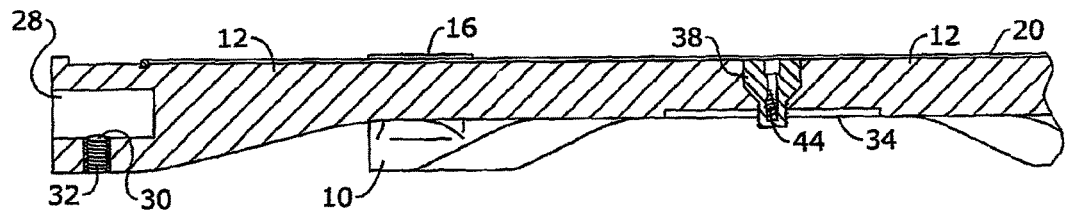
FIG. 6 is a sectional view, taken along lines 6-6 of FIG. 2, in enlarged scale.
Figure 7:
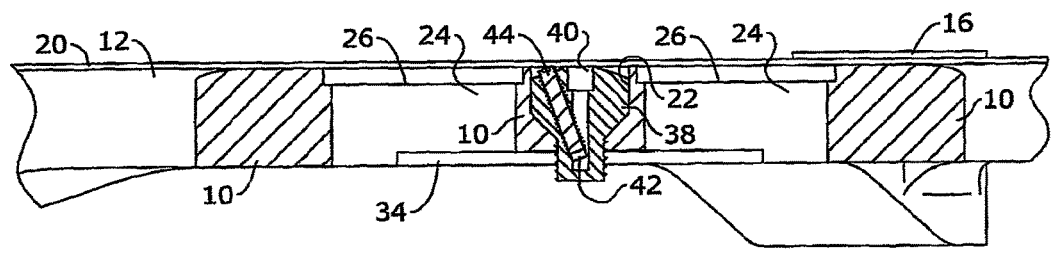
FIG. 7 is a sectional view, taken along lines 7-7 of FIG. 2, in enlarged scale.
Figure 8:
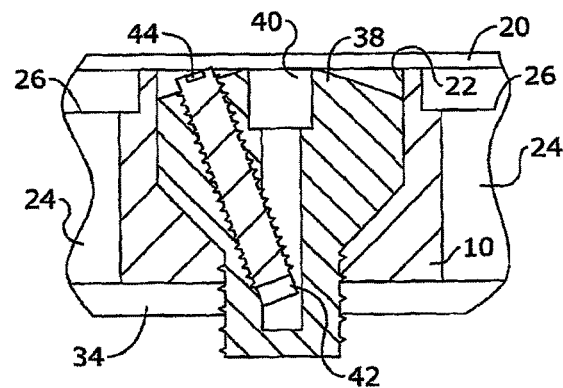
FIG. 8 is a close up view of the retaining screw taken from FIG. 7.
Figure 10:
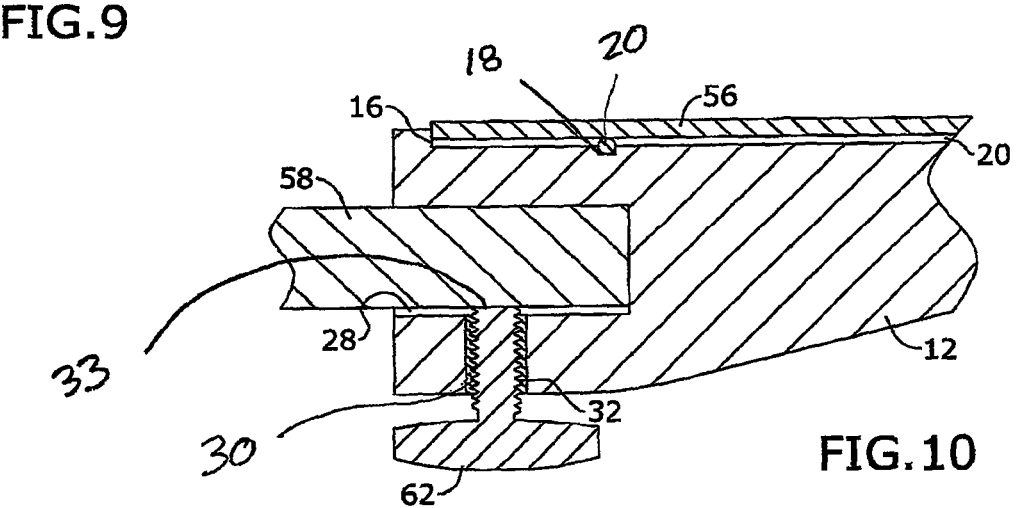
FIG. 10 a close up view of a mounting station of the photography workstation of FIG. 1 depicting an exemplary attachment method.
Figure 11:
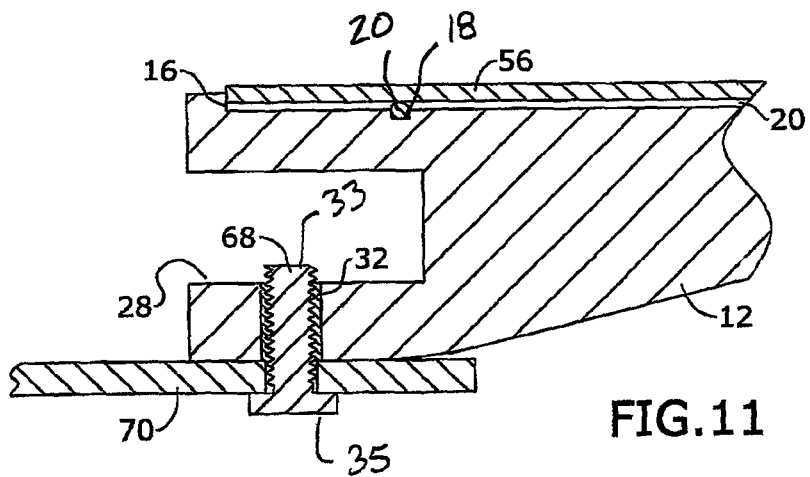
FIG. 11 is a close up view of a mounting station of the photography workstation of FIG. 1 depicting another exemplary attachment method.

Referring now to FIG. 11, an alternative mounting system is provided wherein the mounting station 28 includes an optional tubular recess and a fastener bore 30 as in FIG. 3. However, the accessory mounting structure 70, such as a plate, flange, or tang, is removably secured to the undersurface of the arm 12 by a threaded fastener 68 such as a bolt with a threaded section 32 and an enlarged head 35 which may be inserted through a complementary aperture in the mounting structure 70 along the lines of the bore 30 in FIGS. 3 and 10. The inner end 33 of the bolt may project into the tubular recess 28 or not. This alternative mounting structure is merely to illustrate another means of attaching an accessory to the mounting station. It will be appreciated that the mounting structure 70 may extend into a drawer or holder extending from the workstation to provide a space for parts, tools, and other storage items. In addition, the outer end of the mounting station could present a solid surface with a fastener hole, hook, hanger, or other means described herein to releasably attach an image or video capture accessory. By way of example, it will be appreciated that other mounting constructions will occur to one of ordinary skill in the art including clamps, alligator clips, bayonet clips, straps, buckles, simple interference or friction fits, rotating locking collars, hook and loop fasteners, magnets, snaps, buttons, sleeves, twist locks, quick release fasteners, threaded fasteners hooks, extension poles, articulating arms and other suitable restraining means and photographic accessories. The main function to be satisfied is removable securement of one or more accessories about the workstation to facilitate image or video capture or accessory maintenance.

With reference now to FIGS. 2-9, the central region 11 of the working platform 10 includes a central recess 22 projecting through the working platform and four radially projecting mounting screw slots 24 bounded by ledges 26 for retaining bolt heads. The central recess and screw slots project though the working platform from the upper surface 27 to the lower surface 29. Within the central recess 22 is placed the object positioner 38 in the form of a locking bolt. The locking bolt or anchor body 38 includes a central bore 40 extending from the top surface of the bolt toward the bottom surface of the bolt along a center long axis. In this exemplary embodiment, while the locking bolt may extend completely through the working platform 10 (as shown projecting into the bottom side recess 34 in FIG. 3) and even into the base 48, the central bore 40 of the locking bolt does not extend all the way through the locking bolt or anchor body, although this is possible as well. In this exemplary embodiment, the central bore 40 is hex shaped, although other shapes including circular, rectangular, triangular, oval, oblong, or other suitable shape may be used to complement the object holder 54 profile discussed below. A second bore 42 includes an opening that is offset from the opening of the central bore 40 and projects through the locking bolt body 38 at an acute angle relative to a central longitudinal axis projecting through the central bore to intersect the central bore within the locking bolt body as shown in FIGS. 6-9. The second bore includes a threaded channel for receiving a threaded fastener 44 such as a set screw. The topmost end of the locking bolt 38 may extend above, be recessed beneath, or made flush with the upper surface 27 of the working platform.

Figure 9:
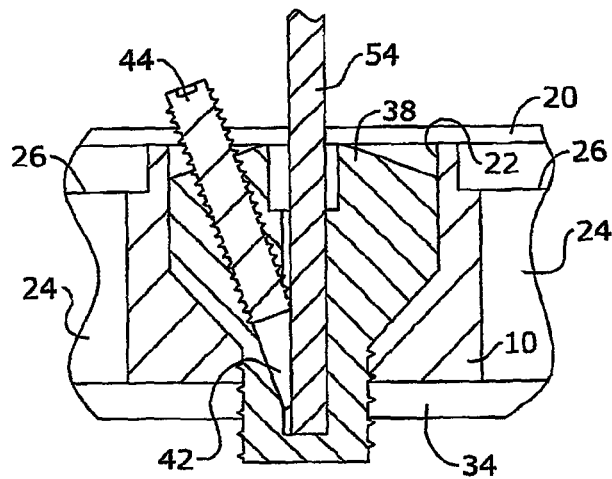
FIG. 9 is a view similar to FIG. 8 with a partial object support shown in the retaining screw.

An object holder 54 (FIGS. 1 and 9) in the form of a wire or rod may be inserted into the central bore 40 to engage the object positioner 38 with one end of the wire or rod 54 inserted into the central bore and an opposing end extending outside the central bore. The bore insertion end of the wire may be constructed to complement the profile of the center bore 22 of the anchor body 38. The exposed end of the wire may be inserted into an object 72 to removably secure the object 72 to the turntable or workstation assembly. In this exemplary embodiment, the exposed end of the wire or rod may be inserted into an object such as an apple 72 to hold the apple in place or may contain a platform to rest an object, or may be bent in a manner to secure, elevate or otherwise position an object in any manner desired. The wire may also be removably secured to the turntable or workstation assembly by threading the set screw 44 into the angled bore 42 until at least a portion of the interior end of the set screw abuts a portion of the outer diameter of the wire 54 as shown in FIG. 9. It will be appreciated that such configuration facilitates a firm placement of the object positioner such that the upper surface 41 (FIG. 5) of the object positioner 38 is disposed flush with or beneath the upper surface 27 (FIG. 2) of the working platform 10 to avoid appearing in the image or spaced above the upper surface if desired while allowing the user to release the object positioner without requiring release of the platform/table from its mount. While in this exemplary embodiment, the wire 54 includes an exposed end for piercing an object to hold it in place, the exposed end of the wire may come in various suitable configurations for securing an object including a threaded or unthreaded post, rod, clamp, clip, snap, magnet, buckle, strap, hook and loop, button, hook, hanger, anchor, or even a platform with complementary sections on the object and mounting wire as needed.

In addition to the working platform 10, the upper surface 27 of the working platform provides a region for an interchangeable tray 56 placed onto the platform with an optional O-ring 20 (FIGS. 4, 6, 10-11) disposed within an O-ring slot 18. The O-ring is sandwiched between the upper surface 27 of the working platform and undersurface of the tray 56. The O-ring slot 18 is recessed from the outer ridge 16 of each arm 12. The interchangeable tray overlies the arms 12 of the working platform 10 and provides a surface 57 to support the object if needed and also cooperate with the image capture accessories 52, 64, and 76 to provide unique image captures of the object 72. For example, the interchangeable tray may be transparent, semi-transparent, translucent, or opaque. In addition, the upper surface 57 may be reflective, mirrored, textured, colored, patterned, printed, silk-screened, engraved, or manufactured with different materials, including textiles, artificial grass, carpet, metal, wood, or plastic in order to provide different image capture effects as desired by the photographer. The tray may also be elevated to permit lights to illuminate the underside of the tray, such as light table or infinity table. It is a simple matter to remove the tray and exchange for another tray with different characteristics. The tray includes an aperture 59 to be aligned with the center bore 22 of the working platform so the wire 54 may extend through the tray. In this exemplary embodiment, the center bore 22 and aperture 59 are centered within the lateral confines of the working platform 10 where the object positioner 38 is located. However, it will be appreciated that the bore 22, aperture 59, and object positioner 38 may be off center and that multiple sets of bores, apertures, and object positioners may be used.

Figure 12:
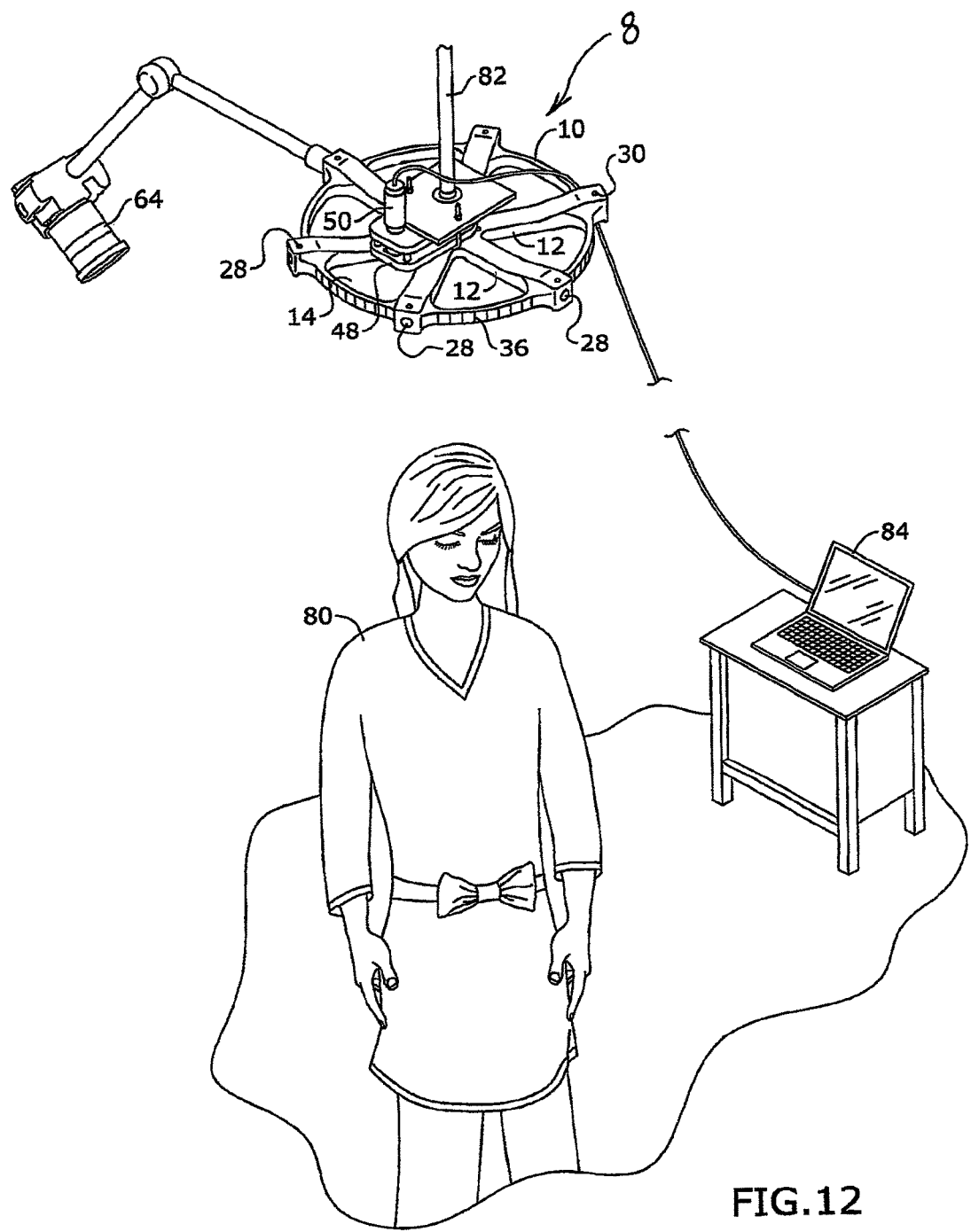
FIG. 12 a perspective view of the photography workstation of FIG. 1, in reduced scale, in an inverted position and connected to a processing device.

With reference to FIGS. 1 and 12, the working platform 10 may be rotatably coupled to the base 48 to form a turntable assembly that defines a boundary. As one example, the working platform may be bolted to a rotating section of the base 48 by inserting bolts 60 (FIG. 1) through the elongated slots 24 to engage the ledges 26 and into a complementary hole in the base 48 and secured using complementary nuts as would be understood by one of ordinary skill in the art. While in this configuration the base may have a lower support surface to enable placement of the turntable assembly onto a planar support surface, the base may also have other features such as a tripod 46 (FIG. 1) or coupled to a suspension post 82 (FIG. 12) to enable suspension of the turntable assembly in an inverted position above the object to be captured 80 coupled with the rotation of accessories such as camera(s), light(s), lighting accessories or other and may be designed to rotate or be maintained in a static position. This inverted position allows alternatively an object to be secured via wire 54 and either held static or rotated with or without other accessories. The working platform 10 may also simply sit on a track and bearing set coupled to the base to spin freely relative to the base 48 under manual manipulation along the lines of a lazy susan. Alternatively, a gear system may also be used to facilitate rotation of the working platform relative to the base. The gearing system may enable continuous rotation throughout a three hundred sixty degree arc or inhibit motion through a lesser arc. Stops may be added to releasably lock the working platform relative to the base at certain positions as well. Alternatively, a stepper motor or other suitable motor 50 (FIG. 12) may be placed in communication with a processing device 84, either through wired or wireless communication, to control the rotation of the working platform relative to the base using a control structure such as a computer program. For example, the working platform or base may be coupled to a Dynamic Perception Stage R motor mount. In similar fashion, a remote control device 78 (FIG. 1), such as a joystick, may be used to control the function of the gear system or motor. The base may also be mounted at an angle on an inclined surface to vary the image capture effects as well.

Materials:

The components described herein may be constructed of metal, wood, elastomers, plastic, composites or a combination thereof. In one embodiment, the frame is constructed of aluminum with a titanium center. The upper surface of the platter 56 may be constructed with different textures, colors, appearances as desired to enhance the photo shoot. Image or video capture accessories for use with the workstation such as the camera, lighting element, background element, fill cards, reflectors, flashes, video cameras, infinity tables, microphones, sound emitting equipment, fog machines, and green screens are typically off the shelf items that one of ordinary skill in the art would be familiar with, although customized accessories may be used as well.

In Use:

Referring now to FIGS. 1, 4, and 12, the image or video capturer (photographer or videographer) may place the workstation or turntable assembly (working platform 10 and base 48) on a support surface such as by using the tripod 46 shown in FIG. 1. The object positioner 38 is threaded in or out of the center hole 22 of the working platform to locate the top surface 41 of the object positioner at a desired height. One end of the object holder 54 may then be inserted into the center bore 40 of the object positioner (anchor) 38 and removably secured using the set screw 44 threaded into the angled bore 42. The O-ring 20, if being used, may be placed within the O-ring slot 18 of the working platform. The image capturer may select an optional interchangeable tray 56 with the desired characteristics and place the tray atop the upper surface 27 of the working platform to sandwich the O-ring therebetween. At this point, the exposed end of the holder 54 projects through the aperture 59 of the tray 56. The object to be image captured 72 may be driven onto the exposed piercing or holding end of the holder 54 and placed in an abutting relationship with the tray or suspended above the tray as desired for the image capture.

With reference to FIG. 1, depending on the image capture configuration, the image capture may releasably secure a lighting element post 58 to a mounting station 28 by inserting one end of the post 58 into the tubular recess of the mounting station and securing the post 58 with a post screw 62 such as shown in FIG. 10. The lighting element 52 may be secured to the distal end of the lighting element post 58. Similarly, a camera 64 may be mounting at another mounting station 58 using a camera mounting post 66 and a background element 76 secured to yet another mounting station 58 using a background element post and clamp 74. A preferred, but non-limiting, mounting post 58, 66, and 74 includes articulated and/or telescoping arms for adjusting the positions of the accessories 52, 64, and 76 in relation to the object to be image captured 72.

If a motor 50 is not being used, the image capture may simply rotate the working platform 10 relative to the base 48 by hand using the degree markers 36 if desired. If a motor is being used, then the image capturer may either use a remote control device 78 (FIG. 1) such as a joystick to control the motion of the working platform or a programmed device 84 (FIG. 12) such as a laptop, desktop, mobile device, or other suitable processing device to control the rotation of the working platform in advance or in real time.

In this exemplary embodiment, the image capture accessories 52, 64, 76 are removably secured to the turntable assembly (working platform 10 and base 48) outside the perimeter of the working platform with the object to be captured within the perimeter of the working platform. In one instance, the object 72 rotates along with the rotation of the working platform 10 and accessories 52, 64, 76. In another configuration, the peripheral region 13 and mounting stations accessories may rotate relative to a fixed holder 54 and fixed object 72. For example, the anchor 38 and holder 54 may be secured to the base 48 and the working platform 10 rotates relative to the base, anchor, and object so that the accessories 52, 64, 76 may rotate around a fixed object. Alternatively, the object may be attached to the platform and other accessories positioned with and independent of the platform. The central region 11, peripheral region 13, and object 72 may all be fixed together or rotatable relative to one another as long as at least one of these elements is rotatable relative to the base 48. Rotation of relative elements may be facilitated using discrete elements connected by a race or track that enables such rotation. Other suitable constructions for relative movement, including magnetic couplings, will occur to one of ordinary skill in the art. For example, the working platform may be magnetically coupled to the base and rotatable while floating above the base using suitable magnets.

In another example, the base 48 of the turntable assembly may be suspended from an overhead support surface by a post 82 thereby inverting the workstation 8 above a subject 80 (FIG. 12). In this instance, the tray 56, if being used, should be secured to the working platform using a suitable fastener, although an object 72 may hold the tray to the workstation as well when secured to the holder 38. The workstation 8 may be placed above an object to be captured 80 and either manually controlled or automatically controlled as shown in FIG. 12. In this configuration, it will be appreciated that the anchor 38 and holder 54 may be used to suspend an object 72 from the working platform as well.

It will be appreciated that the central region 11 may be on, above, or below the upper surface 27 of the working platform 10. For example object 72 may be placed directly on the upper surface 27 of the working platform, suspended above the upper surface 27 or suspended below the upper surface of the working platform. Similarly, the object may be placed directly on the tray, above the tray, or below the tray. While the configuration above contemplated placing an object within the perimeter of the working platform with accessories facing inwardly toward the object, it is further contemplated that the object may be anchored to the turntable assembly and disposed outside the central region 11 and even beyond the perimeter 13 and the accessories angled to facilitate image capture in such locations. The workstation may be also be constructed to facilitate rotation of the working platform independent of the object and may include securing an infinity table to the workstation as an alternative tray with the object holder projecting through the tray to secure the object above the infinity table surface.

It will further be appreciated that the image capturing device does not need to be mounted on the workstation. Instead, other image capturing accessories such as the lighting elements, background elements, and exchangeable trays, may be used alone or in combination with the image capturer free to move about the workstation with the camera to capture images or videos of the object secured to the workstation.

It will be appreciated that the term image as used herein contemplates a single image, a series of related or unrelated images, time lapse, full length videos, video clips, and other media varieties, including multi-media. Image capture device or accessory contemplates video capture devices as well. Sound recording equipment for capturing sounds alone or in connection with images or videos may also be used interchangeably.

Overall, the exemplary workstations presented embodying the invention herein provide a convenient working environment for releasably securing one or more image or video capturing accessories about a central platform and releasably secure or pose an object in an upright, inclined, or even inverted position combined with the ability to exchange tray surfaces while enabling the object to be released without removing the tray or working platform. All mounting structures are designed with quick exchange in mind. In addition, the rotational aspects of the workstation allow for rotation of the accessories along with the object or independently. This workstation provides a solution that cuts down on the need for light stands and other image setup structures resulting in less clutter and more productivity.

Certain objects and advantages of the invention are described herein. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure.

It is also contemplated that various combinations or sub-combinations of the specific features and aspects of the embodiments may be made and still fall within the scope of the invention. Accordingly, it should be understood that various features and aspects of the disclosed embodiments may be combined with or substituted for one another in order to form varying modes of the disclosed invention. Thus, it is intended that the scope of the present invention herein disclosed should not be limited by the particular disclosed embodiments described above.

What is claimed is:

1. A photography workstation for capturing images of an object comprising:
   a working platform including a central hub region and a peripheral region extending radially outwardly from the hub region, the hub and the peripheral regions cooperating to define an object positioning region with an outer surface having a recess projecting at least partially into the working platform;
   a plurality of radially disposed accessory mounting stations extending from the peripheral region with at least one mounting station providing a receptacle constructed to receive a complementary portion of one or more image capturing accessories;
   an object positioner at least partially extending through the recess in the outer surface of the object positioning region and including a first bore projecting at least partially through the object positioner with an opening accessible through the outer surface of the object positioning region of the working platform, the object positioner being constructed to releasably secure an object to be image or video captured to the working platform; and
   a base rotatably coupled to the working platform with the working platform and accessory mounting stations being rotatable together relative to the base.

2. The photography workstation as set forth in claim 1 further including:
   a holder having a first end constructed to releasably position an object to be image or video captured and a second end constructed to releasably engage the first bore of the object positioner; and
   a fastener constructed to releasably secure the second end of the holder to the object positioner, the fastener being accessible through the object supporting surface of the working platform within the hub region.

3. The photography workstation as set forth in claim 1 further including:
   a locking element constructed to removably secure at least one image capturing accessory received in a receptacle provided by at least one accessory mounting station.

4. The photography workstation as set forth in claim 1 further including:
   means for securing the working platform to the base with the working platform, at least one accessory mounting station, and an object to be image or video captured releasably secured to the holder all being able to rotate together around a same axis relative to the base.

5. The photography workstation of claim 1 further including:
   a removable tray overlying at least a portion of the central hub region of the working platform, the removable tray including an aperture providing access to the first bore of the object positioner.

6. The photography workstation of claim 1 further including:
   an anchoring element with an elongated body at least partially defining the object positioner, the elongated body including the first bore and further including a second bore projecting at an acute angle to intersect the first bore with both the first and second bore having a corresponding opening accessible through the outer surface of the working platform;
   a holder having a first end constructed to releasably engage the first bore of the anchoring element and a second end constructed to releasably support the object to be image or video captured; and
   a set screw threadably inserted into the second bore and constructed to engage first end of the holder at an acute angle and inhibit the holder from being removed from the elongated body when the set screw is at least in partial contact with the holder.

7. The photography workstation of claim 1 wherein:
   the object positioner includes an outermost surface flush with or recessed beneath the outer surface of the working platform.

8. The photography workstation of claim 1 further including:
   an image capturing accessory removably secured to at least one mounting station that is selected from one of: a camera, a lighting element, or a background element.

9. The photography workstation of claim 1 further including:
   a tripod connected to the base.

10. The photography workstation of claim 1 wherein:
    the working platform may be manually rotated relative to the base.

11. The photography workstation of claim 1 further including:
    a motorized rotation element coupling the base to the working platform; and
    a computer in communication with the motorized rotation element and operable to command a rotation of the working platform relative to the base.

12. The photography workstation of claim 1 wherein:
    the object positioner is constructed to removably secure the object to be image or video captured to the working platform with the working platform in an inverted position.

13. The photography workstation of claim 1 wherein:
    the base is constructed to be removably secured to a support surface.

14. A method of using a photography workstation to capture one or more images of an object comprising:
    providing a photography workstation with a base supporting a working platform defining an interior central region at least partially bounded by a peripheral region with a plurality of radially outwardly disposed accessory mounting stations with at least one mounting station including a receptacle constructed to receive one or more image capturing accessories and having a locking element constructed to removably secure the one or more image capturing accessories to the at least one mounting station, the working platform further including an object positioner positioned within the interior or peripheral regions of the working platform and at least partially extending through a recess in an outer surface of the working platform within the central or peripheral regions, the object positioner including a first bore and a second bore intersecting the first bore at an acute angle with both bores having an opening accessible through the outer surface of the working platform within the central or peripheral regions;

rotatably coupling the base to the working platform to define a turntable assembly with the working platform and at least one mounting station being rotatable together relative to the base;

providing a holder with a first end constructed to engage the object positioner through the first bore;

releasably securing at least one object to be image or video captured to the holder;

releasably securing the holder to the object positioner by inserting a fastener into the second bore to intersect the first end of the holder;

removably securing at least one image capturing accessory to at least one mounting station with the locking element; and capturing one or more images of the object releasably secured to the object positioner while rotating the working platform in an upright or inverted orientation.

15. The photography workstation of claim 14 further including the step of:

placing a tray with an aperture onto the working platform with the aperture providing access to the object positioner prior to releasably securing the at least one object to the object positioner.

16. The photography workstation of claim 14 further including the step of:

removably mounting a background accessory to a mounting station.

17. The photography workstation of claim 14 further including the step of:

removably mounting a lighting accessory to a mounting station.

18. A photography workstation for capturing images of an object comprising:

a base;

a working platform rotatably coupled to the base to define a turntable assembly, the working platform defining an interior region with an upper surface at least partially bounded by a peripheral region having a plurality of accessory mounting stations that rotate around the same axis as the working platform when the interior region of the working platform rotates relative to the base, at least one mounting station including a receptacle with a locking element constructed to removably secure a complementary portion of at least one accessory to the working platform;

an object positioner positioned at least partially within the interior region of the working platform, the object positioner including an elongated anchor body with a first bore accessible through the upper surface of the working platform and a second bore also accessible through the upper surface of the working platform and intersecting the first bore at an acute angle;

a holder including a first end inserted into the first bore of the object positioner and a second end constructed to assume a variety of orientations and releasably secure an object to be image or video captured to the turntable assembly;

a set screw inserted into the second bore and accessible through the upper surface of the working platform, the set screw intersecting the first end of the holder at an acute angle and inhibiting the withdrawal of the holder from the object positioner; and an exchangeable tray overlying at least a portion of the interior region of the working table, the exchangeable tray including an aperture with access to the anchor body of the object positioner and wherein one or more image capturing accessories may be removably secured to the working platform at one or more accessory mounting stations and used to capture images or videos of an object removably secured by the holder at least partially within the interior region and on or adjacent the exchangeable tray.

19. The photography workstation of claim 18 wherein:

the interior region of the working platform includes a centrally located hub with a plurality of radially projecting spokes defining the peripheral region of the working platform with the accessory mounting stations located at the outermost ends of the spokes;

the object positioner is disposed within the hub; and the holder is constructed to release the object without removing the platform or tray.

20. The photography workstation of claim 18 further including:

a motor rotatably connecting the working platform to the base; and a processing device in communication with the motor and programmed to transmit rotation commands to the motor to rotate the working platform relative to the base.

* * * * *